Nov. 1, 1927.
F. O. DUTTON, JR
1,647,513
PANE WIPER
Filed Sept. 20, 1923
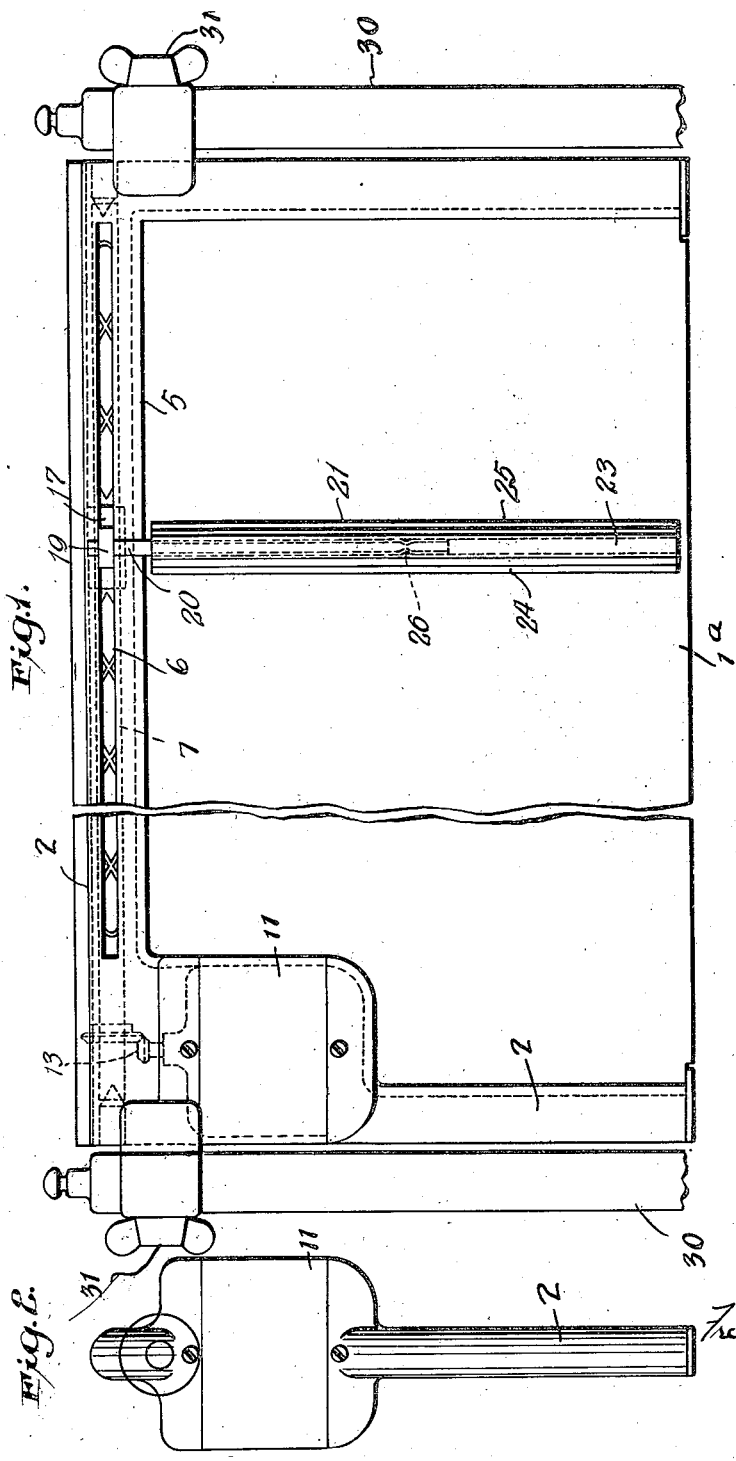
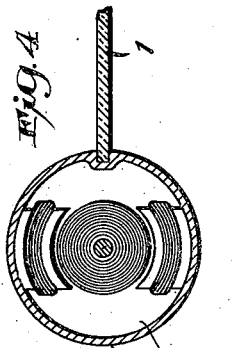
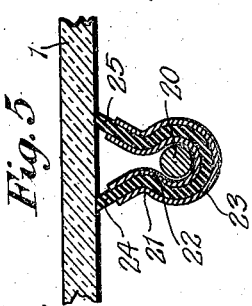
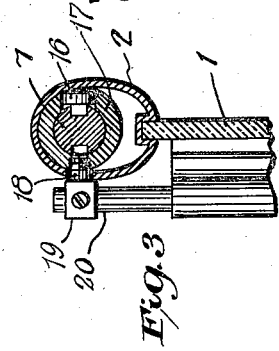
INVENTOR
Frederick O. Dutton, Jr.
BY
ATTORNEY Patented Nov. 1, 1927.

1,647,513

UNITED STATES PATENT OFFICE.

FREDERICK O. DUTTON, JR., OF YONKERS, NEW YORK.

PANE WIPER.

Application filed September 20, 1923. Serial No. 663,751.

The invention has to do with pane-cleaners, such as wind-shield wipers for automobiles. The purpose, generally stated, is to provide a device having a novel and effective mode of operation and of advantageous construction. Another object is to provide a mechanical wind-shield wiper incorporated with the wind-shield.

In the accompanying drawings forming part hereof:

Fig. 1 is an elevation looking at the inner side of a windshield embodying the invention, an intermediate part of the windshield being broken out;

Fig. 2 is an end view;

Fig. 3 is a vertical, transverse section;

Fig. 4 is a horizontal section through the motor; and

Fig. 5 is an enlarged cross-section of the wiper member.

The windshield supports are marked 30, and the frame 2 of the pane 1 is hung in usual pivot fastenings 31 on these supports. The pane 1 is recessed at one of the upper corners, and the casing 11 of an electric motor 10 is fitted into this recess, the top and side members of the frame 2 being joined to or integral with the top and bottom sections of the motor case. The shaft of the motor is geared at 13 to the end of a rotary shaft 7 that extends lengthwise within the upper member 5 of the frame of the windshield pane, this shaft being formed with a crossing thread which is engaged by a follower 16 swiveled in a traveler 17, which as the shaft is rotated is caused to move back and forth along the shaft in a known manner.

A stud 18 fixed in the traveler projects through a longitudinal guide slot 6 in the frame member 5, and carries on the outside a block 19 in which is set the end of a wiper rod 20. Said rod extends downward at the inner side of the pane, and carries the wiper proper 21.

The construction and operation of the wiper proper also presents advantages; and it will be seen to comprise inner and outer curved or incompletely circular shells or stampings 22, 23, with diverging wiper lips 24, 25 held between their diverging channels.

The wiper lips, of rubber or other suitable material, may be either in one piece with each other, as shown, or not. The channels are slightly squeezed to hold the lips, and the inner shell is pinched at 26 into the round rod to secure it thereto. The rod lies longitudinally in the embrace of the inner shell as shown in Fig. 3.

As the wiper reciprocates transversely to itself, each of the similar, diverging, rubber lips 24, 25 in line contact with the pane, alternately, operates by a chiseling or plowing action to give a primary cleaning to the glass, while the other, at the same time, acts by a dragging or wiping effect to give a secondary and final cleaning, the rôles of the two lips being exchanged at each reversal of movement. The support afforded to the lips throughout their length, inside and outside, by the oblique extensions of the inner and outer shells insures that the lips will preserve their positions and perform their functions at all times, and that each lip will exert uniform pressure throughout its length in the chiseling and wiping effects. The edges of the lips themselves are of chisel-form, as shown.

What I claim as new is:

1. In a windshield, a pane having a corner recess, a frame holding the pane, a motor casing incorporated within a corner of the pane-frame and fitting into the recess in the pane, the top member of the pane-frame being hollow and slotted, a screw in said member having crossing threads and geared to the motor, a reciprocating traveler coacting with said screw, and a wiper connected through said slot with the traveler.

2. In a pane wiper, a rod, inner and outer shells providing a pair of channels, the rod lying in the inner shell and secured thereto, and wiper lips held between the shells and projecting from the channels.

3. In a pane wiper, a rod, inner and outer shells providing a pair of channels in diverging relation, the rod lying in the inner shell and secured thereto, and projecting wiper lips held in diverging relation between the shells.

FREDERICK O. DUTTON, Jr.